Patented Jan. 13, 1942

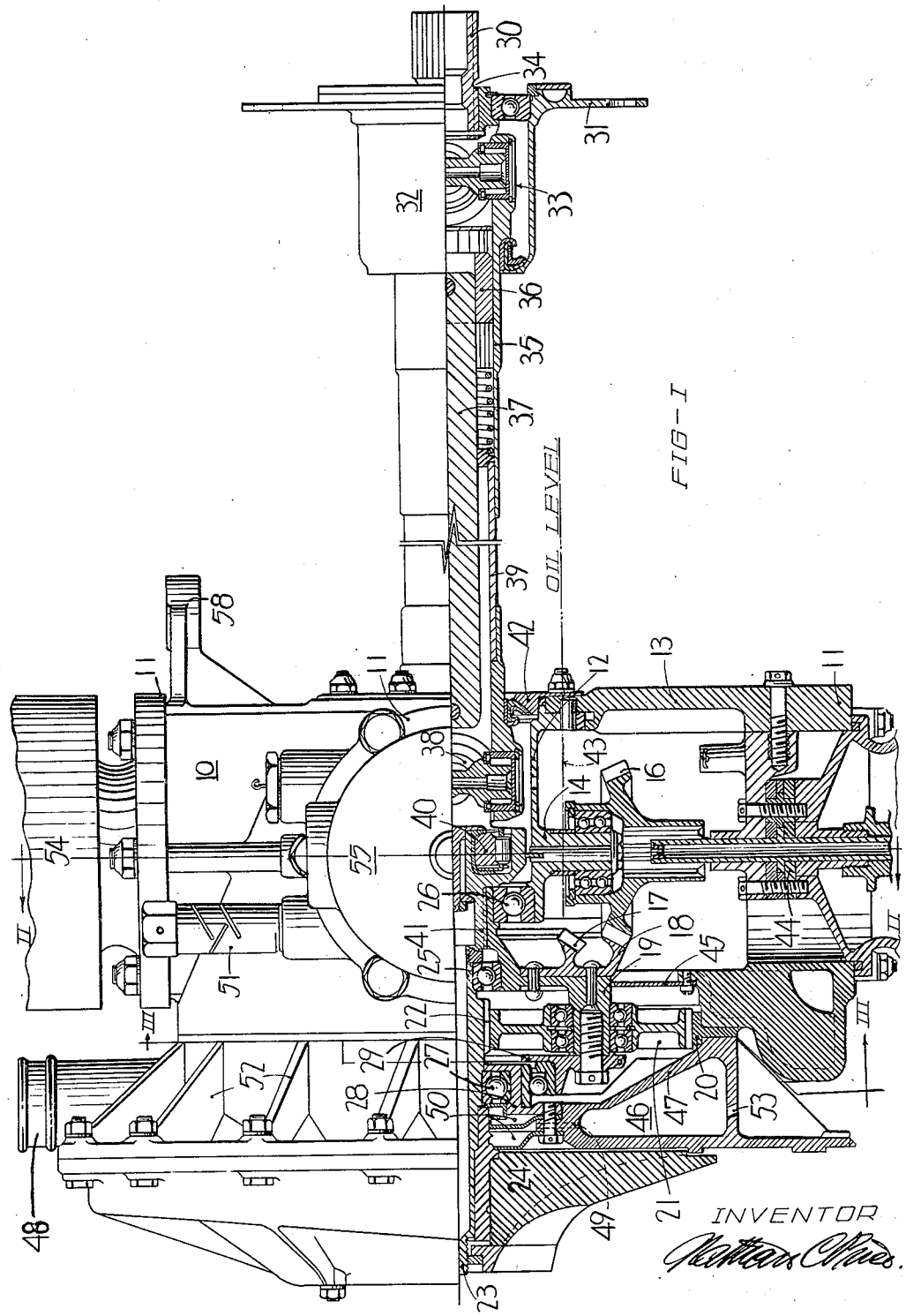

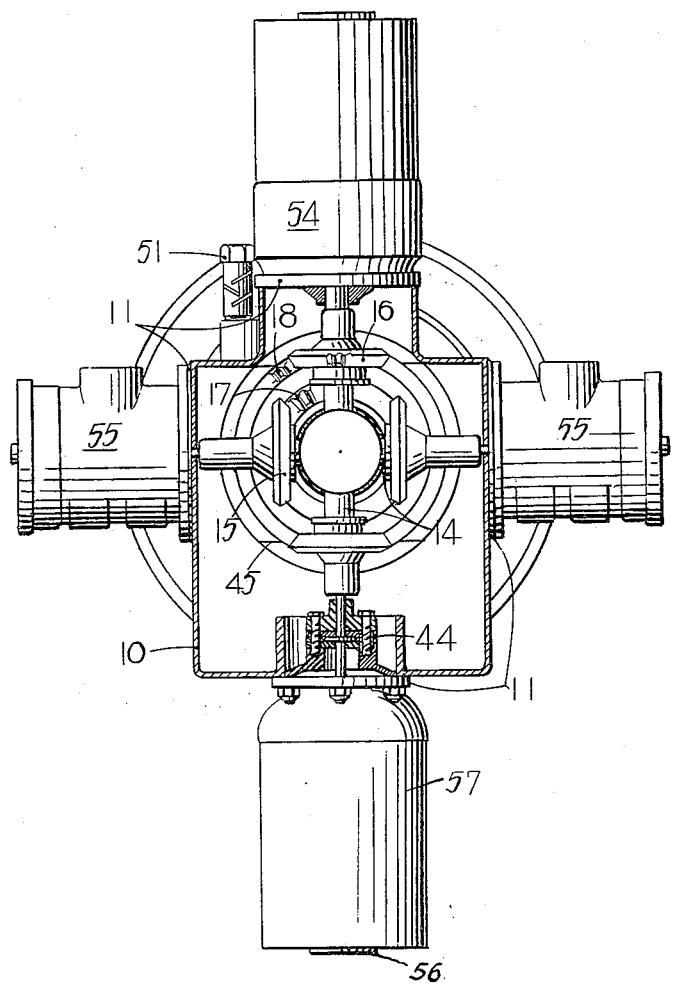
FIG-II

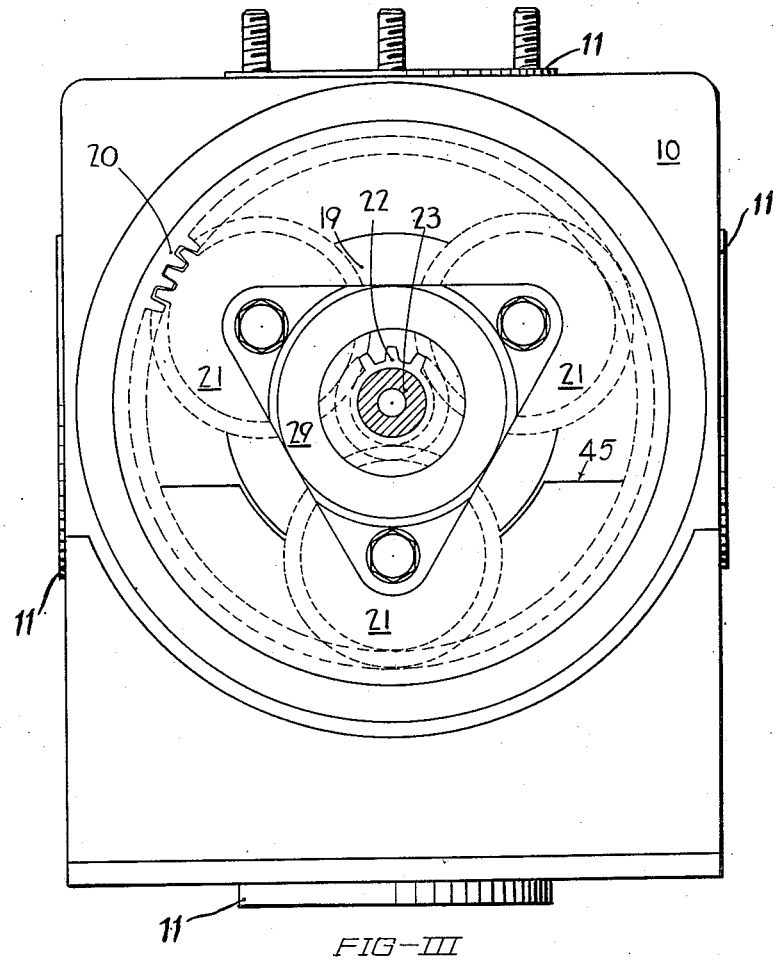
FIG-III

2,269,916

UNITED STATES PATENT OFFICE 2,269,916

AIRCRAFT ACCESSORY DRIVE

Nathan C. Price, Los Angeles, Calif., assignor to Lockheed Aircraft Corporation, Burbank, Calif.

Application June 29, 1940, Serial No. 343,273

15 Claims. (Cl. 74—305)

This invention relates to an improved driving arrangement for a plurality of accessories. In present day airplanes the engines are commonly provided with one or more power take-off drives for the operation of airplane accessories—as distinguished from engine accessories—for example, hydraulic pumps for operating plane components such as retractable landing wheels and wing flaps, vacuum and/or refrigerant pumps, a generator, fluid circulating pumps, and cabin air circulating blowers or superchargers. Naturally, such diverse items of equipment will have different optimum operating speeds, so that a variety of optional speed ratios are desirable in the drive, all of which must function simultaneously and continuously during the operation of the powerplant. Each airplane design may involve variations in the type and optimum driving speed of one or more of the accessories therefor so that it is highly desirable to provide a flexible accessory drive unit wherein the individual accessories may be driven at different speeds, with the possibility that subsequent changes in various units may make it desirable to change the driving speed thereof without requiring replacement of the driving unit or gear box.

It is accordingly an object of this invention to provide an improved gear box and driving unit for the purposes described wherein adequate provisions are made for a variety of accessory drives at different rotational speeds; the entire assembly forming a compact unit preferably mounted independently from and behind the fire wall customarily provided in connection with the engine mounting. To this end I provide a flexible drive from the engine to the gear box to compensate for engine movements in the usual flexible mountings provided therefor, and desirably include a one way clutch in the drive to reduce the stresses resulting from torsional forces when the drive system passes through a resonant condition in accelerating from idling to the cruising speed range.

It is a further object of this invention to provide an improved gear box for the purposes described, wherein the various gears, bearings and other parts taking driving stresses can be concentrated in a compact arrangement and so constructed of suitable high strength materials as to relieve the gear box of the major strains, and thus permit it to be made of a light weight material such as a magnesium alloy.

It is another object of this invention to provide an accessory drive of the class described including in one compact unit a series of accessory bevel gear drives radially arranged in a traverse plane, and integrated with the planetary spider of a planetary step-up drive for a supercharger impeller, to form a compact arrangement wherein the driving bevel gears back up and stiffen the planetary spider to provide a quiet running step up of high ratio. A feature of this arrangement is that a simple oil circulating system can service all the units in the accessory drive gear box.

It is also an object of this invention to provide an improved and simplified multiple accessory drive of the class described wherein two or more accessories are arranged in balanced relationship to a driving member whereby the loads on the driving member are substantially balanced and distributed to reduce the net loads on bearings supporting the driving member.

Other and further important objects of this invention will be apparent from the disclosures in the specification and the accompanying drawings.

This invention in its preferred form is illustrated in the drawings and hereinafter more fully described.

In the drawings—

Figure I is a side elevation, partly in longitudinal section, showing a preferred embodiment of this invention.

Figure II is a traverse section on the line II—II of Figure I showing accessory units driven from the gear box of this invention.

Figure III is a traverse section on the line III—III of Figure I, adjacent the plane of the supercharger step-up drive.

As shown—

The accessory drive gear box disclosed herein is intended to be driven from a power take-off drive commonly built into airplane engines. Such engines are usually so mounted as to have an appreciable degree of movement relative to the fuselage or engine nacelle in which they are supported, which movement is composed of both vibratory and torque components. In disclosing this invention it has been considered unnecessary to include the engine, its mounting, and the power take-off arrangement, it being considered sufficient to show the drive therefrom.

A gear case 10, having a plurality of accessory mounting pads 11 arranged in a plane traverse to the axis of the case, is advantageously constructed of an extremely light weight material such for example as a magnesium alloy. Such an alloy is light in weight and has high thermal conductivity, but has poor concentrated load carrying ability, poor corrosion resistance, and high thermal expansivity, as compared to heavier alloys of the ferrous type.

A concentrated steel structure has been provided for carrying the loads of the accessory drives, comprising a cantilever tube or shell 12 supported from a traverse wall 13 of the case 10, the shell having outstanding radial ears forming stub shafts 14 for accessory driven bevel gear pinions 15 and 16. As is shown, and will be described in more detail hereinafter, the pinions 15 form a low speed drive, and the pinions 16 a higher speed drive, being interchangeable on each of the stub shafts 14 so that subsequent changes in the driving rates may be made at any of the locations without changing other unit drives. The cantilever tube or shell 12 provides for accurate alignment of all gears and bearings, and has a relatively low coefficient of expansion, taking all concentrated loads and hence eliminating the need of stiffening liners otherwise required in various bearing locations in the light metal case 10.

The drive of the individual bevel pinions 15 and 16 is accomplished from coaxial bevel gears 17 and 18 which lie in planes traverse to the axis of the cantilever tube or shell 12. These bevel gears are carried by a spider 19 of a planetary step-up gear drive comprising a stationary internal gear 20, planet gears 21 carried by the spider 19 and a sun gear 22 integral with an impeller drive shaft 23 for a supercharger impeller 24. The impeller drive shaft has a bearing 25 in the spider 19 which in turn is supported by a bearing 26 in the end of the cantilever tube or shell 12, the other or impeller end of the drive shaft 23 being supported from the case 10 by a bearing 27 in a member 28 which also supports the outboard end of the spider 19 by means of a bearing 29. The foregoing arrangement results in a very compact layout for the bevel gears and the planetary drive, with a reduction in the number of bearings required, and a considerable saving in weight because the bevel gears contribute to the stiffness of the planetary spider and vice versa.

As a specific example of gear ratios available in such a layout, with the proportions indicated in the drawings, a low speed of approximately 1.6 to 1, and a high speed of 3 to 1 are selectively available through the bevel gear drives, while the supercharger impeller step-up may vary from 8 to 12 to 1. It is of course evident that wide variations from the speed ratios mentioned may be made while following the teachings herein.

The spider 19, carrying the bevel gears 17 and 18, is driven from the engine through a flexible drive shaft shown to the right in Figure I. The power take-off provided at the engine, not shown herein, comprises a female splined member into which the splined end 30 of the flexible shaft is inserted, being retained in place by a flange 31 and a lubricant retaining housing 32 for the first universal joint 33. The splined end 30 is preferably notched as at 34 to provide a shear pin effect limiting the load on the engine power take-off to a safe figure. The universal joint 33 includes a tube 35 having splines driving a plug 36 forming one end of a laminated torsion spring member 37 which transmits the load to a second universal joint 38 which is provided with a tube 39 telescoping in the tube 35 to completely enclose the torsion spring. The second universal joint 38 transmits the drive to the hub of a one-way roller clutch 40, the rim of which has an extension 41 in splined driving relation with the spider 19 inside the bearing 26. The second universal joint 38 and the one-way clutch are housed in the cantilever shell 12 and retained in place by an oil sealing flange 42 secured to the wall 13 of the gear case 10. Thus the shell 12 provides a recess that permits use of a longer drive shaft, reducing the extreme operating angles and lengthening the torsional springs.

A definite lubrication pattern and oil cooling system is provided for the gear case and drive shaft. An oil bath is provided at a central level indicated by the line 43, submerging the bottom bevel pinion 16, and an oil circulating pump 44 is driven by this pinion, delivering a jet of oil of predetermined quantity to the planetary gears 21. A sheet metal partial partition 45 is extended upwards to above the oil level to prevent an excess of oil in the planetary gear section of the case, which section is practically cleared of oil by the rotation of the planetary gears which splash oil out into the upper part of the gear case. Also, the initially submerged pinion 16 and the lower portion of the bevel gear 18 transfers or splashes oil to the other pinions, and a fog like mist of oil is carried in the air and to the various bearings as well as to the drive shaft and universal joints.

An air cooling system cooperates with the oil circulating system to cool both the oil, the gear box, and accessories driven therefrom, as well as to prevent leakage of oil vapor into the supercharger. A toroidal air chamber 46 is formed by a portion 47 of the gear case between the supercharger impeller 24 and the planetary gear chamber, the air chamber having a rammed air inlet connection 48 from a forwardly facing opening in the airplane structure to provide a positive pressure in the air chamber 46. The pressure air is fed through passages 49 to an oil trap 50 about the impeller shaft 23 whence it passes into the case 10 and thus prevents oil from working into the impeller housing due to suction therein at certain times. From the case air borne oil droplets are fed into the cantilever shell 12 to lubricate the one-way clutch and universal joint, as well as the drive shaft as a whole, and a baffled breather 51 provides a final vent from the case 10.

As a result of the rammed air supply to the torroidal chamber 46, the planet gear portion of the gear case is effectively cooled by heat absorption in the air, the air flow being particularly effective in cooling the impeller bearing and shaft. The high velocity swirl of air and entrained oil droplets caused by the impelling action of the rotating planet gears produces a high rate of heat dissipation from the planetary system to the toroidal chamber. Radial stiffening webs 52 extend along the outside of the toroidal chamber for stiffening purposes, and a number of air bleed passages 53 may be drilled into the chamber 46 adjacent the webs 52 to further cool the case metal. Such air bleeds or jets may also be provided to cool the adjacent accessories if so desired.

In Figure II a number of accessories are shown as mounted on pads 11 of the gear case 10. A generator 54 is shown at the top, vacuum and refrigeration pumps 55 at the sides, and a water circulating pump 56 and reservoir 57 at the bottom, the water pump being driven in tandem with the gear case oil pump 44. These accessories are shown for illustrative purposes only as different installations may require different groups of accessories or a greater number thereof, requiring either more mounting pads, tandem drives for two or more units, or more than one set of bevel driving gears.

It is contemplated, in the specific design described above, that the accessory drive gear box will be separately mounted in the engine nacelle on the opposite side of the usual fire wall associated with the engine mounting, and to this end, two or more mounting pads 58 may be provided on the gear case 10.

The operation of the illustrated embodiment of this invention has been covered in the foregoing description. However, some features of the invention justify further comments. The design permits a wide range of choice of accessories, that may require different driving speeds, so that several models of airplanes may be equipped therewith. The cantilever shell construction is of special advantage from a production standpoint since it assures accurate assembly and alignment, as all bearings and gear mountings are embodied in a single unit that can be accurately jigged for production. The shell also confines the overrunning clutch and universal joint, so that in case of breakage therein parts cannot be thrown into the gear portion of the case. A similar result is obtained by the telescopic tube enclosure of the torsion spring, and at the engine end of the drive shaft protecting adjacent parts of the engine such as magnetos.

It will thus be seen that I have invented an improved and simplified accessory drive mechanism resulting in improved initial and maintained operating accuracy in the assembly of high speed step-up drives, with a resulting quietness in the operation thereof; and in a compact and light weight assembly providing for a multiplicity of drives at varying and selected speed ratios.

Having thus described my invention and the present preferred embodiments thereof, I desire to emphasize the fact that many modifications may be resorted to in a manner limited only by a just interpretation of the following claims.

I claim:

1. An accessory drive mechanism of the type described comprising a gear case having a plurality of accessory mounting locations radially disposed in a plane traverse to the axis of the case, driving means axially mounted in said case including a planetary step-up drive and bevel gears associated therewith, bevel pinions driven from said bevel gears, and mounting means for said bevel pinions adapted to align the said pinions with the accessory mounting locations on said gear case.

2. An accessory drive mechanism of the type described comprising a gear case having a plurality of accessory mounting locations radially disposed in a plane traverse to the axis of the case, driving means axially mounted in said case including a pair of dissimilar bevel gears, interchangeable bevel pinions adapted to be driven from one or the other of said bevel gears, and mounting means for said bevel pinions adapted to align the said pinions with the accessory mounting locations on said gear case.

3. An accessory driven mechanism of the type described comprising a gear case having a plurality of accessory mounting locations radially disposed in a plane traverse to the axis of the case, driving means axially mounted in said case including a planetary step-up drive and a pair of coaxial but dissimilar bevel gears associated therewith, bevel pinions driven from one or the other of said bevel gears whereby to provide different speed ratios, and mounting means for said bevel pinions adapted to align the said pinions with the accessory mounting locations on said gear case.

4. An accessory drive mechanism of the type described comprising a gear case having a plurality of accessory mounting locations radially disposed in a plane traverse to the axis of the case, driving means centrally mounted in said case including a pair of coaxial but dissimilar bevel gears, bevel pinions driven from one or the other of said bevel gears whereby to provide different speed ratios, and mounting means for said bevel pinions adapted to interchangeably align the said pinions with the accessory mounting locations on said gear case.

5. In an accessory drive mechanism of the class described, a case having a step-up gear drive compartment, and a bevel gear drive compartment, a lubricant reservoir in said latter compartment, an oil circulating pump in said lubricant reservoir adapted to deliver oil to said first mentioned gear drive compartment to be further circulated by the movement of the gears therein, a partial partition between the two compartments extending above the oil level therein, whereby the movement of the first mentioned gearing will eject surplus oil from said gear compartment.

6. In an accessory drive mechanism of the class described, a case having a step-up gear drive compartment, and a bevel gear drive compartment, a lubricant reservoir adapted to deliver oil to said first mentioned gear drive compartment to be further circulated by the movement of the gears therein, a partial partition between the two compartments extending above the oil level therein, whereby the movement of the first mentioned gearing will eject surplus oil from said gear compartment and means providing a flow of air through the said gear compartment into the bevel gear compartment whereby the ejected surplus oil will be distributed over the gears and bearings therein.

7. In an accessory drive unit of the class described, including a supercharger impeller of the centrifugal type, a step-up drive therefor, and means providing an air chamber under positive pressure to supply air between the impeller and the step-up gearing whereby to prevent impeller suction from drawing oil from the step-up drive.

8. In an accessory drive unit of the class described, including a supercharger impeller of the centrifugal type, a step-up drive therefor, means for supplying lubricant to said step-up drive, and means providing an air chamber under positive pressure to supply air between the impeller and the step-up gearing whereby to prevent impeller suction from drawing oil from the step-up drive.

9. In an accessory drive unit of the class described, including a supercharger impeller of the centrifugal type, a step-up drive therefor, a bevel gear accessory drive associated with the step-up drive, and means providing an air chamber under positive pressure to supply air between the impeller and the step-up gearing whereby to prevent impeller suction from drawing oil from the step-up drive and to force air circulation through the step-up and bevel gear drives to distribute lubricant thereover.

10. In a multiple accessory drive, a case having a plurality of power take-off openings radially arranged in a traverse plane, an axially disposed cantilever shell member attached at one end to an end wall of said case and extending inwardly therefrom, pinions journaled by said member in alignment with the radial openings in the case, and driving means for said pinions having a bearing in said shell member, whereby the pinions and their driving means will be maintained in fixed relationship by said member.

11. In a multiple accessory drive, a case having a plurality of power take-off openings radially arranged in a traverse plane, an axially disposed cantilever shell member attached at one end to a wall of said case, pinions journaled by said member in alignment with the radial openings in the case, driving means for said pinions having a bearing in said shell member, said driving means also forming a planetary spider for a planetary gear drive, and an impeller driving sun gear shaft journaled in said driving means whereby the cantilever member maintains the alignment of the operating members in said case.

12. In a multiple accessory drive, a case having a plurality of power take-off openings radially arranged in a traverse plane, an axially disposed cantilever shell member attached at one end to a wall of said case, pinions journaled by said member in alignment with the radial openings in the case, driving means for said pinions having a bearing in said shell member, and a flexible drive for said driving means including an over-running clutch and a universal joint housed in said cantilever shell member.

13. In a gear case of the type described, the combination with a light alloy metal case, of a high strength ferrous metal shell mounted in said light alloy metal case, said shell providing load carrying mounting means for gears and bearings within said case.

14. In combination with a gear case of a material characterized by light weight, and poor concentrated load bearing properties, a load and bearing member centrally disposed in said case and formed of a material characterized by high strength and load bearing properties, driving means coaxial with said load and bearing member and journaled therein, and gearing driven by said driving means and supported in operating relationship thereto by said load and bearing member.

15. In combination with a gear case of a material characterized by light weight, and poor concentrated load bearing properties, a load and bearing member axially disposed therein of a material characterized by high strength and load bearing properties, driving means coaxial with said load and bearing member and journaled therein, and gearing driven by said driving means and supported in peripheral relationship thereto by said load and bearing member.

NATHAN C. PRICE.